May 13, 1947.  W. M. GILMAN  2,420,394
UNLOADING VALVE FOR HYDRAULIC CIRCUITS
Filed Dec. 10, 1945  2 Sheets-Sheet 1

Inventor:
Wilbert M. Gilman
By
Attorneys:

May 13, 1947. W. M. GILMAN 2,420,394
UNLOADING VALVE FOR HYDRAULIC CIRCUITS
Filed Dec. 10, 1945 2 Sheets-Sheet 2

Inventor:
Wilbert M. Gilman
By
Attorneys

Patented May 13, 1947

2,420,394

UNITED STATES PATENT OFFICE 2,420,394

UNLOADING VALVE FOR HYDRAULIC CIRCUITS

Wilbert M. Gilman, Wellesley Hills, Mass., assignor, by mesne assignments, to Cread Engineering and Research Company, Cranston, R. I., a corporation of Rhode Island Application December 10, 1945, Serial No. 633,916

6 Claims. (Cl. 137—153)

This invention relates to an improved unloading valve for hydraulic circuits and particularly to a valve of this type capable of rapid operation or snap action in functioning for the purpose specified.

One object of the invention is to provide an unloading valve for use in hydraulic systems comprised of a high pressure accumulator and a normally continuously driven pump.

Another object is to provide an unloading valve of the type indicated which will operate promptly and rapidly to connect the pump to the accumulator when the pressure in the latter drops below an established level, whereby to recharge it; and when the accumulator has been fully charged will divert the flow to a storage tank to unload the pump when its functioning is not required.

Another object is to provide an unloading valve of the type indicated for use in aircraft hydraulic supply systems where the pump is normally driven continuously direct from the motor and maintains pressure in an accumulator for actuating landing gear, wing-flaps and other parts of the aircraft.

Another object of the improvement is to provide a valve of the type indicated which is simple in construction, practically instantaneous in action, and efficient in operation for the purposes specified.

Further objects of the improvement are set forth in the following specification which describes a preferred form of construction of the device, by way of example, as illustrated by the accompanying drawings. In the drawings.

Figure 1:
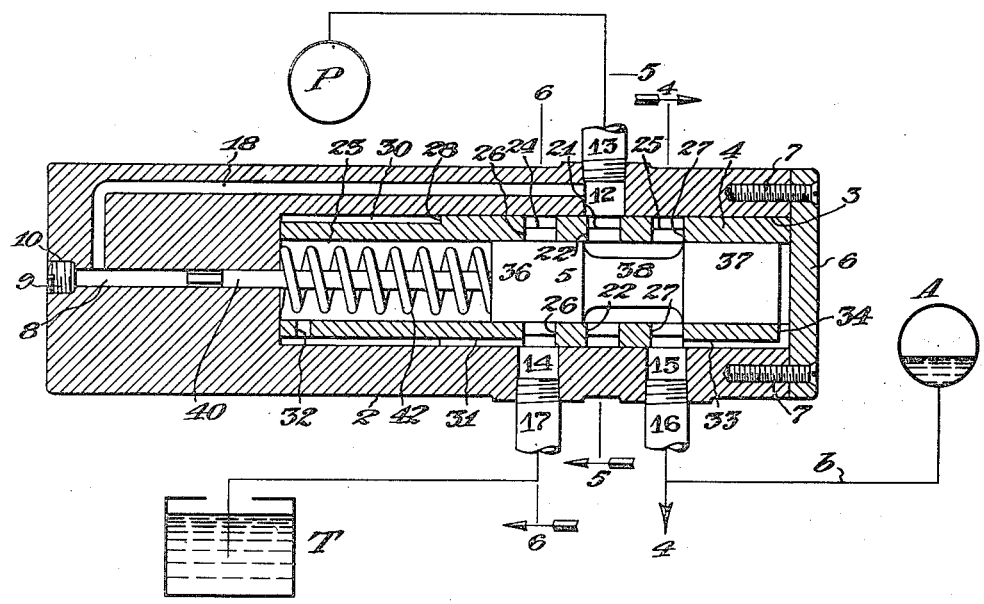
Fig. 1 is a sectional view of the valve taken on its longitudinal axis and showing the parts adjusted to connect the pump to the accumulator with the connections represented diagrammatically.

In various types of hydraulic systems, such as in aircraft for operating the controls, the loads are extremely intermittent, drawing heavily on the accumulator charge when they occur and requiring operation of the pump at full pressure for short periods only to recharge the accumulator. When the accumulator becomes fully charged it is essential to unload the pump by circulating the hydraulic fluid through the storage tank and it is of advantage that the valve operate promptly and rapidly with a snap action to accomplish this purpose. It is therefore one of the objects of the present invention to provide an improved valve capable of snap action for unloading the pump so as to promptly relieve the pressure and prevent undue strain and wear on the parts.

The present improved unloading valve may comprise a cylindrical casing 2 bored axially at 3 to receive a bushing or liner 4 providing a central chamber for the slidable plunger or piston 5. As herein shown the bore 3 of the casing 2 is sealed at its open end by means of a cap or closure 6 secured thereto by screws 7. The opposite end of the casing 2 is provided with a much smaller bore 8 closed by a screw 9 threaded into a counterbore 10. The casing 2 is provided on one side with an inlet opening 12 for connection with a pipe 13 or other conduit leading from the pump P, represented diagrammatically in Figs. 1 to 3 of the drawings. At the opposite side of the casing 2 are two outlet openings 14 and 15 spaced apart equidistantly from the axis of the inlet opening 12. Connected to the opening 15 is a pipe or conduit 16 leading to the point of load, such as a hydraulic motor or the like, not shown, with a branch b leading to the accumulator A, represented diagrammatically in the drawings. The other outlet 14 is connected by a pipe or conduit 17 to the storage tank T for the hydraulic fluid. At one side of the casing 2 a relatively narrow duct 18 leading from the inlet opening 12 extends parallel to the axis of the casing and then radially inwardly to communicate with the smaller axial bore 8. The inlet opening 12 is thus connected to supply pressure to the smaller bore 8 for a purpose as later explained.

Mounted fast within the main bore 3 of the casing 2 is the cylindrical bushing or liner 4, shown in perspective view in Fig. 7, which is provided with a plurality of radial ports communicating with the several inlet and outlet openings previously described, and also with certain longitudinal ducts employed for purposes later explained. The bushing or liner 4 is formed on its periphery with an annular circumferential slot 21 positioned to register with the inlet opening 12 in the casing 2 and provided with cylindrical ports 22 leading radially into the bore 23 of the bushing. Spaced equidistantly from the central slot 21 at either side thereof are similar circumferential slots 24 and 25 provided with radial ports 26 and 27, respectively. The ports 26 opening into the slot 24 communicate with the outlet opening or orifice 14 connected to the tank T, while the ports 27 opening into the slot 25 communicate with the outlet orifice 15 which is connected to the accumulator A.

Figure 7:
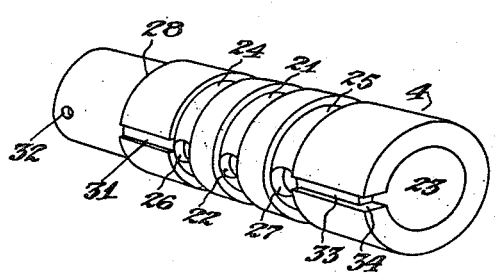
Fig. 7 is a perspective view of the cylindrical bushing or liner in the bore of the valve-casing which is provided with ports adapted to be opened or closed by the slidable valve-piston or plunger.

As shown most clearly in Fig. 7, the periphery of the liner or bushing 4 is reduced in diameter longitudinally from its rearward end to a shoulder 28 so as to form a cylindrical chamber 30 within the bore 3 of the casing 2. At its forward end the chamber 30 communicates with the circumferential slot 24 through a relatively narrow groove forming a duct 31, while at its rearward end communication is made with the bore 23 of the bushing 4 by means of a cylindrical hole 32. In the forward portion of the bushing 4 is a relatively narrow longitudinal groove which constitutes a duct 33 for effecting communication between the ports 27 and the end of the bore of the bushing through a radial groove 34.

Slidable within the bore 23 of the bushing or liner 4 is the valve-plunger or piston 5 constructed with a pair of spaced cylindrical bosses 36 and 37 at its opposite ends, joined by a reduced stem 38. Beyond the rearward end of the main piston 5 is a small piston 40 slidable in the bore 8. The piston 40 is preferably separate from the piston 5 but adapted to engage the end of the latter. A helical spring 42 encircling the smaller piston 40 has one end seated against the end of the bore 23 in the bushing 4 with its opposite end tensioned against the inner end of the piston 5. The force of the spring 42 tends to slide the piston 5 to the right, as viewed in Fig. 1, whereof to close the ports 26 communicating with the storage tank T while opening the ports 27 communicating with the accumulator A as shown in Fig. 1. In the reverse position of the piston 5, shown in Fig. 3, the ports 26 are opened and the ports 27 closed so that the valve will function to circulate the hydraulic fluid from the pump P through the storage tank T and back to the pump under substantially atmospheric pressure. The method of operation of the valve is as next explained.

The accumulator A operates between set pressure limits to supply loads as desired for actuating hydraulic motors and other apparatus or work-units. The function of the unloading valve is to connect the pump to recharge the accumulator when the pressure in the latter drops below the established level; and when the accumulator has been fully charged to divert the flow from the pump to the storage tank T at substantially atmospheric pressure to unload the pump when its functioning is not required. Assuming that the accumulator is initially uncharged, the piston 5 will be displaced by the spring 42 to a position at the extreme right, see Fig. 1, so that the pump is directly connected to the accumulator A through the valve ports 27, slot 25, opening 15, pipe 16 and branch b. During this action of the piston 5 pump pressure is applied to the end of the small piston 40 through the duct 18 to the small bore 8, thereby acting to accelerate the movement of the piston 5 toward the right under the force of the spring 42.

Figure 2:
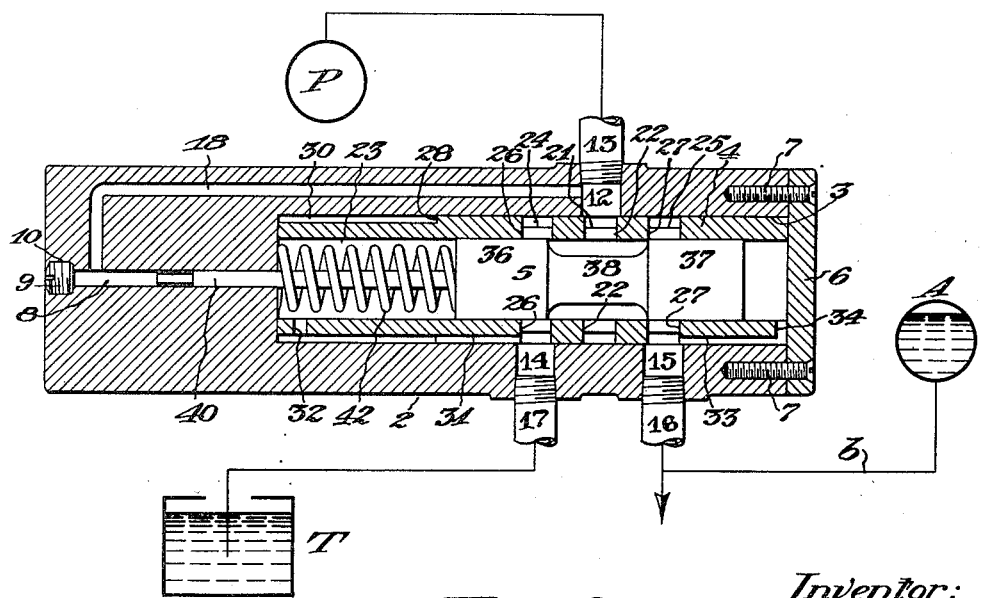
Fig. 2 is a similar sectional view showing the parts of the valve in position to shut off the supply to the accumulator and start to unload the pump by diverting its flow to the storage tank.
Figure 3:
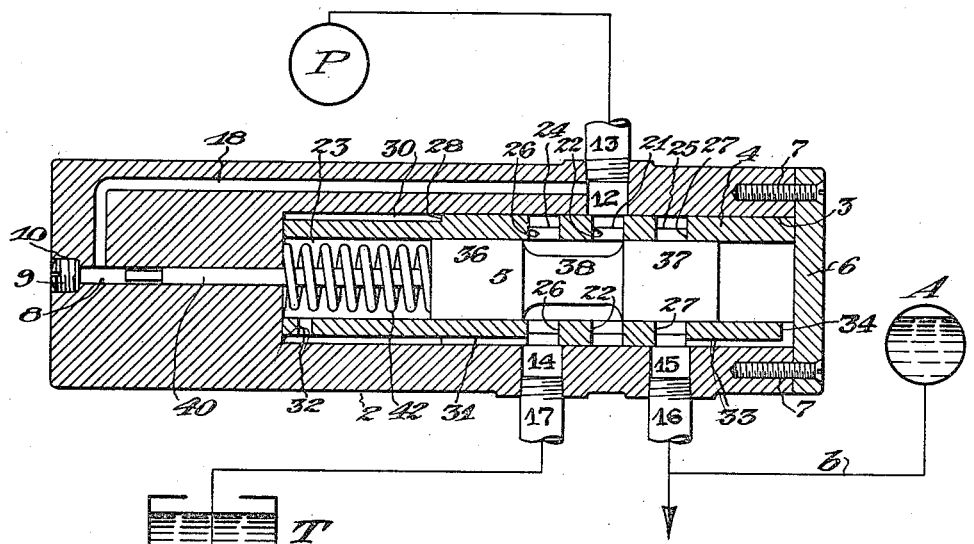
Fig. 3 is a similar sectional view showing the valve adjusted to completely unload the pump by diverting its flow to the storage tank.
Figures 4, 5, 6:
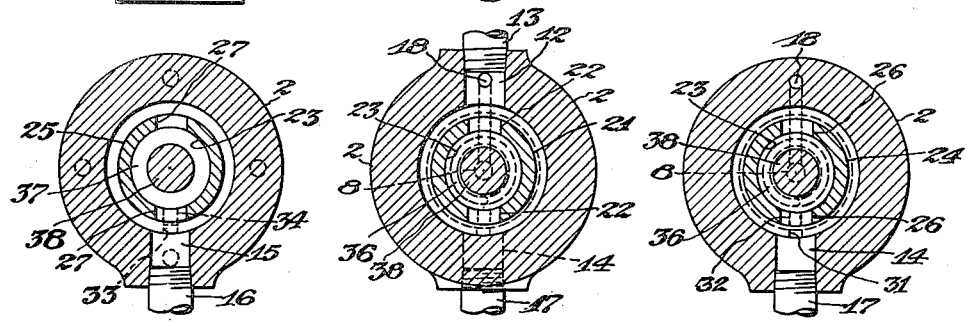
Fig. 4 is a transverse sectional view of the valve on line 4—4 of Fig. 1.
Fig. 5 is a similar transverse sectional view on line 5—5 of Fig. 1.
Fig. 6 is a similar transverse sectional view on line 6—6 of Fig. 1.

As the pressure in the accumulator A is built up, a point is reached at which the force due to this pressure acting upon main piston 5, less that developed by the same pressure acting on the auxiliary piston 40, overbalances the force of the spring 42, causing both pistons 5 and 40 to move toward the left as viewed in Fig. 2. At the point of travel of the pistons indicated in Fig. 2 the ports 26 communicating with the outlet opening 14 connected to the storage tank T start to be uncovered simultaneously with the closing of the ports 27 communicating with the accumulator A. This causes a drop in the inlet pressure, which is communicated to the auxiliary piston 40, thereby reducing the force exerted by the latter and permitting further compression of the spring 42 and movement of both pistons toward the left. This movement further uncovers the outlet ports 26, causing further reduction in the pump discharge pressure and the force exerted thereby through the piston 40. This cumulative action progresses almost instantaneously to a point where the discharge ports 26 are fully uncovered and the pistons are at the limit of their stroke. In this position the ports 26 communicating to the storage tank T are then fully opened and the pump pressure is reduced substantially to atmospheric while the valve communication to the accumulator A is fully closed.

When the accumulator pressure drops through service to the hydraulic motor or other apparatus to a value at which the force of the spring 42 overcomes the force due to the accumulator pressure acting on the main piston 5 alone, the latter will travel toward the right. As this motion is continued to a point where the ports 26 communicating with the storage tank T become constricted, the pump pressure will build up, thus adding to the force of the spring 42 a component exerted by the smaller piston 40. This action will cause accelerated motion of both pistons to completely close the ports 26 which communicate with the storage tank T and fully open the ports 27 to establish communication with the accumulator A. At this juncture the valve will function to put full accumulator pressure on both the pump P and pistons 5 and 40, thus completing a cycle.

It will be observed from the foregoing description that the same snap action takes place during the movement of the pistons in either direction, whether diverting pump flow from the accumulator to the storage tank or vice versa, the pistons clicking from one position to the other with an accelerated motion. It is further to be understood that by varying the diameter of the pistons 5 and 40 and/or the characteristics of the spring 42 any desired relationship between the cutting in and cutting out pressures may be obtained with use of the present improved valve.

While the present improved valve is herein described and illustrated as embodied in a preferred form of construction, various modifications in the structure and arrangement of its parts may be made without departing from the spirit or scope of the invention. Therefore, without limiting myself in this respect, I claim:

1. A valve comprising a casing having a main pressure chamber and an auxiliary restricted pressure chamber, an inlet port leading into the main chamber and a pair of spaced outlet ports opening therefrom, a piston slidable in the main chamber of the casing and having spaced areas disposed to continuously maintain the inlet port open while operative to alternately open one outlet port and close the other outlet port, a smaller piston in the restricted chamber acting in opposition to the main piston, a conduit leading from the inlet port to the restricted chamber, and a second conduit leading from one of the outlet ports to the main chamber beyond the end of the main piston.

2. In a valve of the type indicated, a casing having a main pressure chamber and an auxiliary restricted pressure chamber, an inlet port communicating with the main chamber, a duct leading from the inlet port to the restricted chamber, a pair of spaced outlet ports opening from the main chamber, a piston slidable in the main chamber and having spaced areas disposed to continuously maintain the inlet port open while operative to alternately close one outlet port and open the other outlet port, a smaller piston in the restricted chamber, a spring for sliding the main piston, and a duct leading from one of the outlet ports and communicating with one end of the main chamber.

3. In an unloading valve, a casing provided with a main axial chamber extending partly therethrough and a smaller chamber at one end thereof, an inlet port communicating with the main chamber in the casing, a duct leading from the inlet port to the end of the smaller chamber, a piston having spaced bosses connected by a reduced stem and adapted to slide in the main chamber of the casing, a second smaller piston at the end of the main piston slidable in the smaller chamber, a pair of outlet ports in the casing spaced on opposite sides of the axis of the inlet port, a duct leading from one of said outlet ports in communication with one end of the main chamber of the casing, a duct leading from the other outlet port in communication with the opposite end of the main chamber of the casing, and a spring for sliding the main piston to close one outlet port and open the opposite port.

4. In an unloading valve, a casing having a main axial bore with an inlet port and spaced outlet ports in its walls, a main piston having spaced cylindrical bosses slidable in the bore of the casing and connected by a reduced stem, said inlet port communicating with the bore of the casing between the spaced bosses, a secondary smaller piston at the rear of the main piston and slidable in a restricted bore at one end of the casing, a conduit in the casing leading from the inlet port to the end of the restricted bore in the casing, and a spring tensioned between the end of the main bore of the casing and the end of the main piston for sliding the latter to close one outlet port and open the other outlet port.

5. An unloading valve comprising a casing having an axial bore at one end and a smaller bore at its opposite end, means for closing the ends of said bores, said casing having an inlet opening and a pair of spaced outlet openings in its walls with a conduit leading from the inlet opening to the smaller bore, a bushing in the larger bore of the casing formed with an inlet port communicating with the inlet opening and outlet ports communicating with the outlet openings in the casing, a piston having spaced bosses adapted to slide in the main bore of the bushing and connected by a stem of reduced diameter, a smaller piston at the rear of the main piston and slidable in the smaller bore of the casing, and a spring held under tension between the end of the bore in the bushing and the end of the main piston for sliding the latter to close one outlet port and open the opposite outlet port.

6. In an unloading valve, a casing having an axial bore at one end with a smaller axial bore in its opposite end, an inlet opening at one side of the casing and a pair of spaced outlet openings on the opposite side of the casing, a bushing held in the main bore and formed with three spaced annular circumferential slots provided with ports opening from the bore of the bushing, the ports in the central circumferential slot communicating with the inlet opening and the ports at either side thereof communicating with the outlet openings, a conduit leading from the inlet opening to the end of the smaller bore, a conduit leading from one of the outlet openings to the end of the main bore, a main piston having spaced bosses connected by a reduced stem and slidable in the bore of the bushing, a smaller piston at the rear of said first-named piston and slidable in the smaller bore of the casing, and a spring tensioned between the end of the bore in the bushing and the end of the main piston for sliding the latter to open one outlet port and close the opposite outlet port.

WILBERT M. GILMAN.

REFERENCES CITED

The following references are of record in the file of this patent:

UNITED STATES PATENTS

| Number | Name | Date |
|---|---|---|
| 2,400,039 | Burnett | May 7, 1946 |
| 2,401,845 | Stephens | June 11, 1946 |